United States Patent [19]

Hageman

[11] Patent Number: 4,759,678
[45] Date of Patent: Jul. 26, 1988

[54] VEHICLE RESTRAINT UTILIZING A FLUID CYLINDER

[75] Inventor: Martin P. Hageman, Mequon, Wis.

[73] Assignee: Kelley Company Inc., Milwaukee, Wis.

[21] Appl. No.: 904,698

[22] Filed: Sep. 8, 1986

[51] Int. Cl.$^4$ .............................................. B65G 69/00
[52] U.S. Cl. ................................... 414/401; 414/396; 414/584
[58] Field of Search ...................... 414/401, 396, 584

[56] References Cited

U.S. PATENT DOCUMENTS

| | | | |
|---|---|---|---|
| 2,637,454 | 5/1953 | Rowe | 414/584 |
| 2,693,284 | 11/1954 | Gerhardt | 414/584 |
| 4,127,856 | 11/1978 | Bickel | 414/401 X |
| 4,400,127 | 8/1983 | Metz | 414/401 |
| 4,555,211 | 11/1985 | Metz | 414/401 |
| 4,605,353 | 8/1986 | Hahn et al. | 414/401 |
| 4,630,989 | 12/1986 | Davey | 414/401 |
| 4,634,334 | 1/1987 | Hahn et al. | 414/401 |

FOREIGN PATENT DOCUMENTS 203303 10/1983 Fed. Rep. of Germany ...... 414/401

OTHER PUBLICATIONS

Kelley Company Inc., "Truk Stop Automatic Trailer Restraining Device", 1982, pp. 1–4.

*Primary Examiner*—Peter A. Aschenbrenner
*Assistant Examiner*—Thomas A. Rendos
*Attorney, Agent, or Firm*—Andrus, Sceales, Starke & Sawall

[57] ABSTRACT

An improved vehicle restraint for preventing movement of the vehicle such as a truck away from a loading dock during a loading operation. The vehicle restraint includes a guide frame mounted on the front face of the loading dock and a carriage or slide is moved vertically on the guide frame by a fluid cylinder unit between a lower storage position and an upper operative position. A restraining member is movably mounted with respect to the slide and is biased to an inoperative position where the restraining member is disposed beneath the level of the upper surface of the slide. Extending the cylinder unit will move the slide upwardly into engagement with the ICC bar on the truck and further extension of the cylinder unit after engagement of the slide with the ICC bar will move the restraining member from the inoperative position to an operative position above the level of the slide to thereby provide an obstruction to prevent the truck from pulling away from the loading dock.

19 Claims, 2 Drawing Sheets

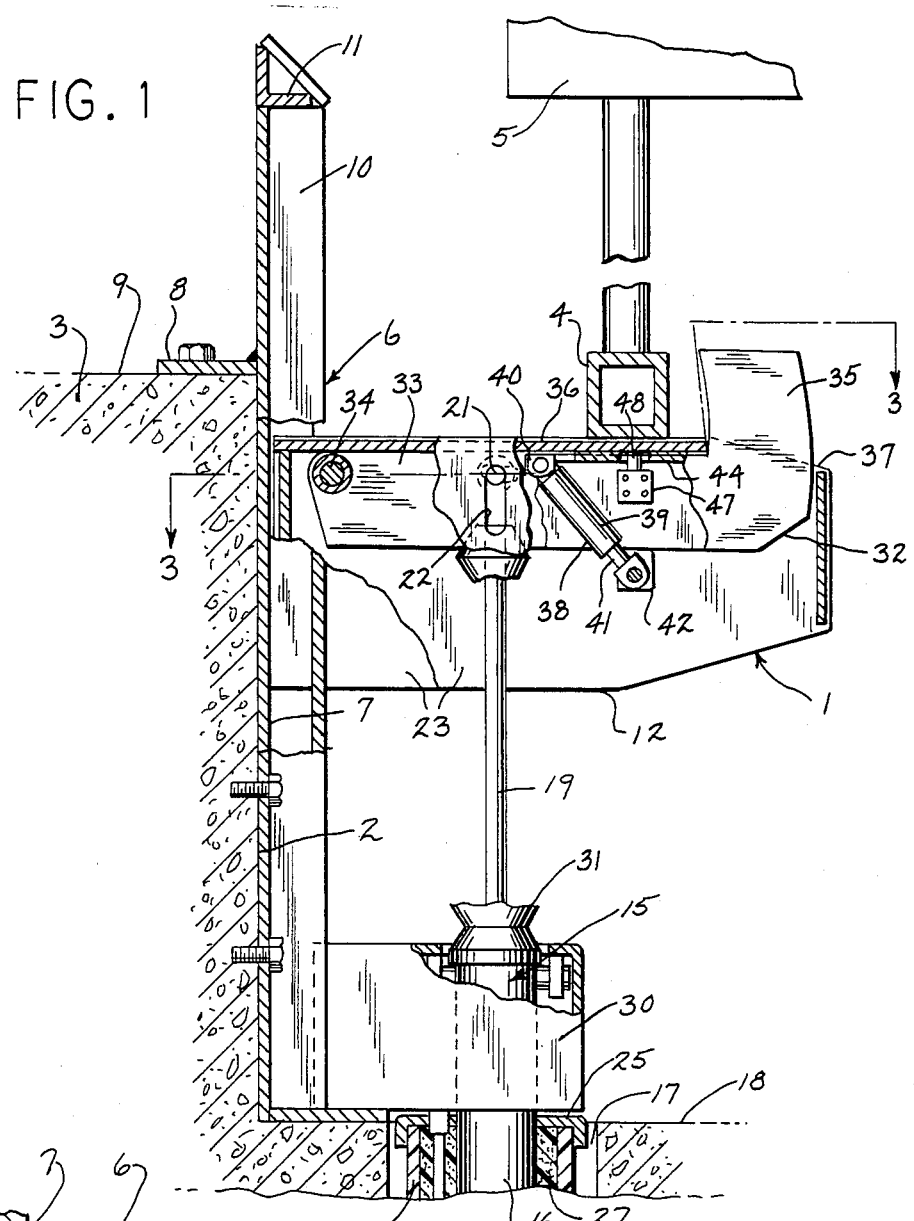
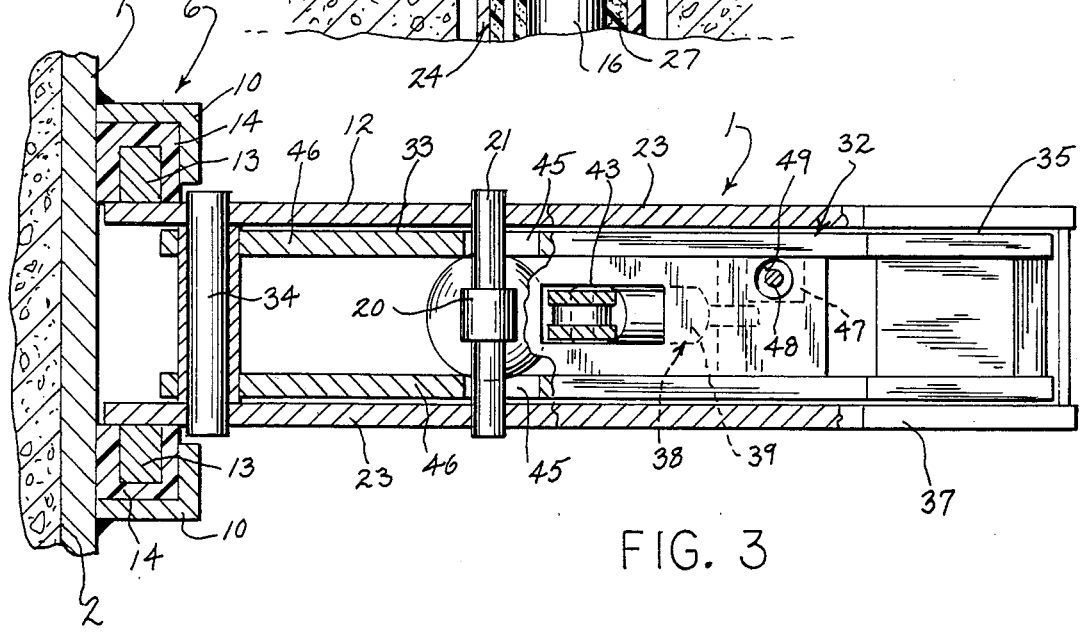

VEHICLE RESTRAINT UTILIZING A FLUID CYLINDER

BACKGROUND OF THE INVENTION

Vehicle restraints are employed to prevent accidental movement of a truck away from a loading dock during a loading operation. When the truck is parked in front of the loading dock, the rear end of the truck completely encloses the doorway in the loading dock with the result that the truck driver cannot observe the loading or unloading of cargo from the truck by a lift truck or other mechanical handling equipment. To prevent the truck from accidentally pulling away from the dock before the loading or unloading operation is completed, vehicle restraints have been used which are mounted on the loading dock and engage the ICC bar located at the rear end of the truck. The ICC bar is a bar or beam that extends horizontally across the rear of the truck beneath the truck bed and is intended to prevent an automobile from underriding the truck in the event of a rear end collision.

Certain types of vehicle restraints employ a pivoting hook that is pivoted from a lower storage position to an operative position where it engages the ICC bar while other vehicle restraints, such as that disclosed in U.S. Pat. No. 4,488,325, employ a linear moving hook which is moved vertically along the front face of the dock from a lower storage position to an upper operative position where it engages the ICC bar.

During a loading operation the truck bed may rise and fall relative to the dock as a forklift truck moves between the dock and the truck bed. In addition, the truck bed will also rise relative to the dock as cargo is unloaded from the truck bed, and conversely, the truck bed will fall relative to the dock as cargo is loaded onto the truck bed and the truck springs are compressed. It is important that a vehicle restraint have the capability of maintaining the hook in engagement with the ICC bar as the truck bed floats relative to the dock. In certain instances, depending upon the truck, the float can be up to ten inches.

SUMMARY OF THE INVENTION

The invention is directed to an improved vehicle restraint for preventing accidental movement of a truck away from a loading dock during a loading or unloading operation. In accordance with the invention, the vehicle restraint includes a guide frame mounted on the front face of the dock and a slide or carriage is mounted to move vertically on the guide frame between a lower storage position and an upper operating position.

The slide is moved between the storage and upper positions by a fluid cylinder unit, including a cylinder that is mounted in a recess or hole in the driveway adjacent the front face of the dock. The upper end of a ram, which is slidable within the cylinder, is connected to the slide. By introducing a fluid, such as air, into the lower end of the cylinder the ram will be extended to move the slide from the storage to the upper position where the upper surface of the slide will engage the ICC bar on the truck. Pivotally mounted within the slide is a restraining member, and the restraining member is normally biased downwardly to a position where the restraining member is located at a level beneath the upper surface of the slide.

The fluid cylinder unit is operably connected to the restraining member in a manner such that when the slide is moved into contact with the ICC bar, continued extension of the ram will overcome the biasing force on the restraining member to pivot the restraining member upwardly to a location above the upper surface of the slide so that the restraining member will then provide an obstruction to prevent outward movement of the ICC bar and truck away from the loading dock.

After the loading operation is completed, the piston rod or ram is retracted to lower the slide and pivot the restraining member to the inoperative position where it is located wholly within the slide.

Due to the compressible nature of the fluid within the cylinder unit, the slide will move downwardly in accordance with downward movement of the ICC bar to follow downward float of the truck bed, and conversely, the fluid pressure in the cylinder will enable the slide to move upwardly to follow upward float of the ICC bar and the truck bed.

Since the restraining member is moved to an inoperative position within the confines of the slide, the truck can readily pull away from the loading dock without interference with the restraining member. This is an advantage over the conventional vehicle restraints in that if the conventional vehicle restraint is in engagement with an extremely low ICC bar and if cargo is applied to the truck bed causing the bed and restraining member to lower, the restraining member may be at a position where it cannot be lowered sufficiently to enable the ICC bar to clear the upwardly extending tip on the hook when the truck attempts to pull away from the dock. However, with the invention, the restraining member is moved to a position beneath the level of the upper surface of the slide so that there will be no obstruction to a truck pulling away from the dock.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation of the vehicle restraint of the invention with parts broken away in section and the vehicle restraint shown in the upper operative position;

FIG. 3 is a section taken along line 3—3 of FIG. 1.

DESCRIPTION OF THE ILLUSTRATED EMBODIMENT

Figure 2:
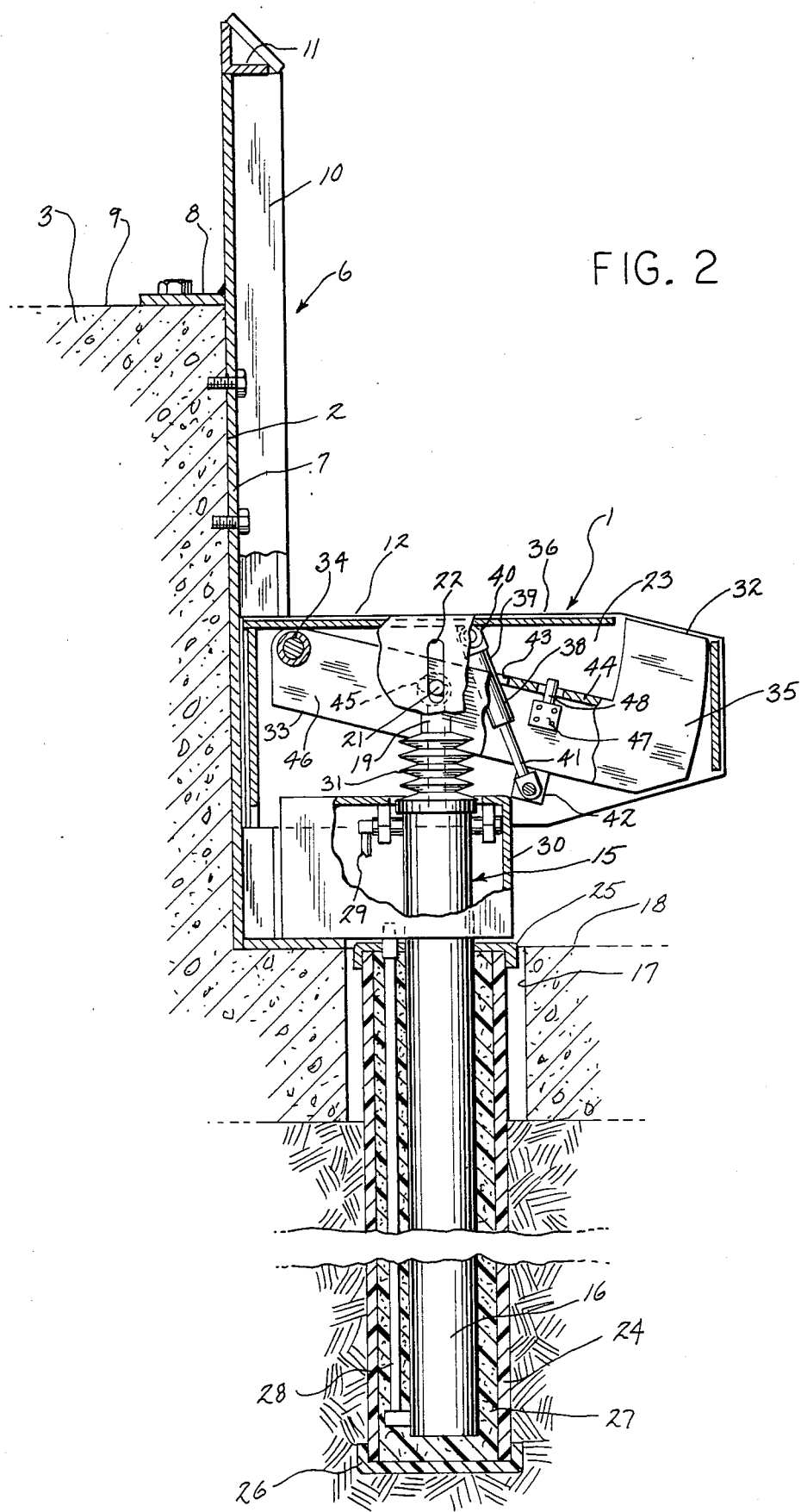
FIG. 2 is an enlarged fragmentary view similar to FIG. 1 showing the vehicle restraint in the lower storage position.

The drawings illustrate a vehicle restraint 1 to be mounted on the front face 2 of a loading dock 3 in position to engage the ICC bar 4 of a truck 5 to prevent the truck from accidentally moving away from the loading dock after a loading operation. The ICC bar is a bar or beam that extends horizontally across the rear of the truck beneath the truck bed and is intended to prevent an automobile from underriding the truck in the event of a rear end collision.

Vehicle restraint 1 includes a frame or supporting structure 6 composed of a vertical mounting plate 7 secured to the front face 2 of dock 3 by suitable anchor bolts. The upper end of plate 7 is welded to a horizontal plate 8 that is mounted in the bottom of a pit 9 formed in dock 3. An adjustable dockboard or dock leveler, not shown, can be mounted in pit 9.

Frame 6 also includes a pair of vertical guide angles 10 which are located in spaced relation on plate 7 and a horizontal top angle 11 connects the upper ends of guide angles 10.

Mounted for vertical movement in guide angles 10 is a slide or carriage 12. Slide 12 includes a pair of guide bars 13 that extend laterally outward from opposite sides of the slide and are mounted for vertical sliding movement in guide angles 10. U-shaped plastic wear strips 14 can be secured to bars 13 to reduce the frictional sliding contact.

Slide or carriage 12 is adapted to be moved between a lower storage position, as shown in FIG. 2, and an upper operative position as shown in FIG. 1 by a fluid cylinder unit 15. Fluid cylinder unit 15 includes a cylinder 16 which is mounted in a recess or hole 17 in driveway 18 located adjacent the front face 2 of loading dock 3. A piston is slidable within cylinder 16 and is connected to a piston rod 19, the upper end of which carries a pin 21 that is mounted within aligned vertical slots 22 formed in side walls 23 of slide 12.

As shown in FIG. 2, cylinder 16 is positioned in a plastic pipe 24 and the ends of the pipe are enclosed by caps 25 and 26. A layer of cushioning material 27, such as polyurethane foam, is located in the space between cylinder 16 and pipe 24. Foam layer 27 serves to protect the cylinder as well as preventing moisture or water from entering the pipe and contacting the cylinder and the fittings. A fluid, preferably a compressible fluid such as air, is introduced into the opposite ends of cylinder 16 through lines 28 and 29. By introducing air in the lower end of cylinder 16 through line 28, piston rod 19 will be extended to move the slide upwardly into engagement with the ICC bar 4 on the truck. Conversely, by introducing air into the upper end of cylinder 16 through line 29, piston rod 19 will be retracted to thereby move slide 12 downwardly to the storage position.

A cover 30 can be secured to the lower end of frame 6 and encloses the upper end of cylinder unit 15 and the fluid connection 29.

To prevent contamination of the piston rod 19 with foreign materials, an expandable bellows-like sleeve 31 of fabric or plastic material can be connected between the cover 30 and the upper end of piston rod 19.

A restraining member 32 is mounted for movement within slide 12. As depicted in the drawings, restraining member 32 has a generally L-shape configuration, including an inner section 33 which is pivotally mounted through shaft 34 to side walls 23 of slide 12 and an outer section 35 that extends upwardly and generally normal to inner section 33. While the drawings show the restraining member being generally L-shaped it is contemplated that the restraining member can take other configurations.

Restraining member 32 is movable between a storage position, as shown in FIG. 2, where the tip of outer section 35 is located slightly beneath the upper surface 36 of slide 12, to an operative position where outer section 35 projects upwardly through an opening 37 in upper surface 36 and forms an abutment, shown in FIG. 1, to prevent ihe ICC bar and the truck from moving outwardly away from the dock 3.

Restraining member 32 is biased to the storage position by a gas spring unit 38 which is interconnected between the slide and the restraining member. Gas spring unit 38 includes a cylinder 39 which is pivotably connected to lugs 40 that extend downwardly from upper surface 36, and a ram or piston member 41 is slidable within cylinder 39 and is pivotably connected to ears 42 that project downwardly from the sides of the restraining member 32.

Gas spring unit 38 is a conventional construction including a closed cylinder which contains a compressed gas such as air or nitrogen. The compressed gas, generally under pressure about 1200 to 1800 psi, exerts pressure on the gas spring piston or ram 41 and provides a biasing action urging the gas spring to extend. In a conventional gas spring, as used in the invention, opposite sides of the piston are connected by an orifice that extends through the piston, thus equalizing the pressure on both surfaces. However, the areas of the opposite surfaces of the piston on which the pressure acts are not equal due to the presence of the piston rod, so that a net force acting to extend the piston rod 41 is created.

As best shown in FIG. 2, gas spring unit 38 extends through an opening 43 formed in the upper wall 44 of restraining member 32.

Restraining member 32 is moved from the storage position to the operative position through action of cylinder unit 15. In this regard, pin 21 extends through aligned slots 45 formed in the side walls 46 of restraining member 32. As previously noted, pin 21 also extends through slots 22 in slide 12. With this connection, as will be hereinafter described, operation of the cylinder unit 15 will move the restraining member 32 from the storage position to the operative position where the outer section 35 of restraining member 32 projects upwardly beyond surface 36 to form an abutment to prevent the truck and ICC bar from moving outwardly away from the dock.

In operation, vehicle restraint 1 is stored in a lower position as shown in FIG. 2 and restraining member 32 is biased to the storage position by the force of gas spring unit 38. As a truck backs toward the loading dock for a loading operation, the rear end of the truck will engage bumpers mounted on the front face of the dock to position the truck bed with respect to the dock.

Fluid cylinder unit 15 is then operated through suitable controls on the loading dock to introduce fluid into the lower end of cylinder 16 through line 28 to cause piston rod 19 to extend and move slide 12 upwardly until upper surface 36 of the slide contacts the ICC bar 4 as shown in FIG. 1. When slide 12 contacts the ICC bar, the slide can no longer move upwardly and further extension of piston rod 19 will cause pin 21 to move upwardly in slots 22. As pin 21 also extends through slots 45 in the restraining member 32, further extension of piston rod 19 will move the restraining member 32 upwardly to the operative position against the force of gas spring unit 38, as shown in FIG. 1.

A limit switch 47 is mounted on one of the side walls of restraining member 32 and an actuating button 48 connected to switch 47 extends upwardly through a hold 49 in the upper surface 44 of the restraining member 32. As the restraining member 32 moves upwardly, button 48 will contact the under surface of top wall 36 to thereby actuate limit switch 47 and provide a signal on the loading dock indicating that the ICC bar is hitched. The signal may take the form of a "hitched" sign or an audio signal.

After the loading operation is completed, fluid cylinder 15 is operated by introducing fluid into the upper end of cylinder 16 to lower slide 12 out of contact with the ICC bar. As cylinder unit 15 lowers, the force of gas spring unit 38 will again bias the restraining member 32 downwardly to the storage position so that there will be no obstruction to outward movement of the ICC bar and truck away from the loading dock.

Due to the compressible nature of the fluid in cylinder 15, the vehicle restraint is able to follow both upward and downward float of the ICC bar during the loading operation to maintain engagement with the ICC bar at all times.

As the outer section 35 of restraining member 32 is positively moved downwardly beneath the level of the surface 36 there is no obstruction to outward movement of the ICC bar. This insures that there will be full release of the vehicle restraint even with extremely low positioned ICC bars.

Various modes of carrying out the invention are contemplated as being within the scope of the following claims particularly pointing out and distinctly claiming the subject matter which is regarded as the invention.

I claim:

1. A vehicle restraint for preventing accidental movement of a vehicle away from a supporting structure, comprising guide means mounted on the supporting structure, a slide mounted for vertical movement on said guide means between a lower storage position and an upper operative position where a surface of said slide is engaged with an abutment on said vehicle, restraining means movably mounted with respect to the slide and movable between a first position where said restraining means is located beneath the level of said surface and a second position where said restraining means projects upwardly beyond said surface and is located outwardly of said abutment to present an obstruction to outward movement of said vehicle from said supporting structure, biasing means interconnecting said slide and said restraining means for biasing said restraining means to the first position, and means connected to said restraining means and operable as a consequence of said slide engaging said abutment on said vehicle for overcoming the force of said biasing means and moving said restraining means from the first position to the second position.

2. The vehicle restraint of claim 1, wherein said slide comprises a top wall and a pair of side walls extending downwardly from said top wall, the outer end of said top wall having an opening, said restraining means disposed within said slide when in said first position and disposed to extend upwardly through said opening when in said second position.

3. The vehicle restraint of claim 2, wherein said restraining means is generally L-shaped and has an inner section pivoted to said side walls and has an outer section extending upwardly from said inner section and disposed to extend through said opening when said restraining means is in said second position.

4. The vehicle restraint of claim 1, and including fluid cylinder means interconnecting said slide and said supporting structure for moving said slide between said storage position and said operative position.

5. The vehicle restraint of claim 4, wherein said fluid cylinder means contains a compressible fluid.

6. The vehicle restraint of claim 1, wherein said restraining means is pivotably connected to said slide.

7. A vehicle restraint for preventing accidental movement of a truck away from a loading dock, comprising a frame mounted on a vertical face of the loading dock and including guide means, a carriage mounted for vertical movement on said guide means and having an upper surface, fluid cylinder means operably connected to said carriage for moving said carriage from a lower position to an upper position where the upper surface of said carriage engages a fixed abutment on said truck, restraining means movably mounted with respect to said carriage and movable between a non-obstructing position where said restraining means is located beneath said upper surface to an obstructing position where said restraining means projects upwardly beyond said surface and provides an obstruction to outward movement of said abutment away from said dock, and connecting means operably interconnecting said fluid cylinder means and said restraining means and arranged so that further extension of said fluid cylinder means after said upper surface of said carriage engages said fixed abutment will cause said restraining means to move from the non-obstructing position to the obstructing position.

8. The vehicle restraint of claim 7, wherein said connecting means comprises a vertical slot in said carriage, and a connecting member connecting said fluid cylinder means and said restraining means and extending through said slot.

9. The vehicle restraint of claim 7, wherein said fluid cylinder means includes a cylinder member and a piston member one of said members being connected to said frame and the other of said members being connected to said carriage.

10. The vehicle restraint of claim 7, and including biasing means interconnecting said carriage and said restraining means for biasing said restraining means to said non-obstructing position.

11. In combination, a loading dock including a vertical face and having a generally horizontal surface extending outwardly from said face, a frame mounted on said face and including vertical guide means, a carriage having an upper surface and mounted for vertical movement on said guide means between a lower position and an upper position where the upper surface of said carriage engages a fixed abutment on a vehicle parked in front of said face, fluid cylinder means operably connected to said carriage and including a cylinder member disposed within an opening in said horizontal surface and a piston member slidable within said cylinder member and operably connected to said carriage, a restraining member connected to said carriage and movable between a storage position where said restraining member is located beneath the level of said upper surface to an operative position where said restraining member projects upwardly beyond said upper surface and presents an obstruction to outward movement of said fixed abutment, biasing means interconnecting said carriage and said restraining member for biasing said restraining member to said storage position, and connecting means interconnecting said piston member and said restraining member and arranged so that further extension of said piston member after said upper surface has engaged said fixed abutment will overcome the force of said biasing means and move said restraining member from the storage position to the operative position.

12. The combination of claim 11, wherein said cylinder member contains a compressible fluid.

13. The combination of claim 11, wherein said restraining member includes an inner section and an upwardly extending outer section, said inner section being pivotally connected to said carriage, said outer section projecting upwardly above the level of said upper surface when said restraining member is in the operative position.

14. The combination of claim 13, and including stop means on said carriage and disposed to be engaged by said restraining member to stop said restraining member in said operative position.

15. A vehicle restraint for preventing accidental movement of a vehicle away from a supporting structure, comprising guide means mounted on the supporting structure, a slide mounted for vertical movement on said guide means between a lower storage position and an upper operative position where a surface of said slide is engaged with an abutment on said vehicle, restraining means movably mounted with respect to the slide and movable between a first position where said restraining means is located beneath the level of said surface and a second position where said restraining means projects upwardly beyond said surface and is located outwardly of said abutment to present an obstruction to outward movement of said vehicle from said supporting structure, means connected to said restraining means for moving said restraining means to the first position, and means connected to said restraining means and responsive to engagement of said slide with said abutment for moving said restraining means to the second position.

16. In combination, a loading dock including a vertical face and having a generally horizontal surface extending outwardly from said face, a frame mounted on said face and including vertical guide means, a carriage means mounted for vertical movement on said guide means between a lower storage position and an upper operating position where a surface of said carriage means engages an abutment on a truck parked in front of said face, fluid cylinder means operably connected to said carriage means for moving said carriage means vertically and including a cylinder member containing a compressible fluid and disposed within a recess in said horizontal surface, said fluid cylinder means also including a piston member slidable within said cylinder member and operably connected to said carriage means, restraining means mounted on said carriage mean and movable between a first position where said restraining means is located beneath the level of said surface to a second position where said restraining means projects upwardly beyond said surface and is located outwardly of said abutment and presents an obstruction to outward movement of said truck from said loading dock, and means connected to said restraining means and operable as a consequence of said carriage means engaging said abutment for moving said restraining means from the first position to the second position.

17. The combination of claim 16, and including sensing means for sensing the presence of said restraining means in said second position, and signalling means operably connected to said sensing means for generating a signal indicating that said restraining means is in said second position.

18. The combination of claim 17, wherein said sensing means comprises a switch on said restraining means and engageable with a section on said carriage means as said restraining means is moved to the second position.

19. The combination of claim 18, wherein said restraining means comprises a hook pivotally connected to said carriage means, said hook including a generally straight inner section and an outer section extending upwardly from said inner section, said switch being located on said inner section and being engageable with said surface of said carriage means.

* * * * *